United States Patent [19]

Nisiguchi et al.

[11] Patent Number: 4,729,593
[45] Date of Patent: Mar. 8, 1988

[54] CONVERTIBLE VEHICLE BODY

[75] Inventors: Sadamu Nisiguchi; Kozo Odoi; Shigeki Akamatsu; Takahiko Akamatsu, all of Hiroshima, Japan

[73] Assignee: Mazda Motor Corporation, Hiroshima, Japan

[21] Appl. No.: 16,361

[22] Filed: Feb. 19, 1987

[30] Foreign Application Priority Data

Feb. 19, 1986 [JP] Japan .................. 61-23297[U]

[51] Int. Cl.⁴ ..................... B60J 7/195; B60J 7/12
[52] U.S. Cl. ............................ 296/154; 296/107; 296/208; 296/213
[58] Field of Search ............. 296/107, 120 R, 120 A, 296/154, 208, 213, 218, 116; 49/476

[56] References Cited

U.S. PATENT DOCUMENTS 2,759,760  8/1956  Omlie ..................... 296/107 X
4,261,615  5/1981  Deaver ..................... 296/210

FOREIGN PATENT DOCUMENTS

102556  3/1984  European Pat. Off. ......... 296/154
 30640  2/1982  Japan ..................... 296/154

Primary Examiner—Dennis H. Pedder
Attorney, Agent, or Firm—Fleit, Jacobson, Cohn & Price

[57] ABSTRACT

A convertible vehicle body including a first door weatherstrip for sealing engagement with a front pillar and a second weatherstrip mounted on the front pillar within the vehicle body and formed with a water pocket.

16 Claims, 10 Drawing Figures

CONVERTIBLE VEHICLE BODY

BACKGROUND OF THE INVENTION

1. Field of the Invention

The present invention relates to a vehicle body, and more particularly to a sealing structure of a vehicle body. More specifically, the present invention pertains to a sealing structure of a convertible vehicle body in which the roof structure can be moved from a closed position to open the top portion of the passenger compartment.

2. Description of the Prior Art

In a convertible vehicle body, a roof structure is provided so that the structure is moved between a closed position wherein the roof structure covers the top portion of the passenger compartment and a retracted position wherein the roof structure is retracted into the vehicle body usually into the rear section of the vehicle body. In some types, the roof structure includes a roof panel which is removably attached to the body.

In these convertible vehicle bodies, difficult problems are encountered in maintaining a reliable seal around the roof structure. Particularly, there have been problems of leakage in the vicinity of the front corner portions of the roof where edge portions of the side doors meet the roof structure.

SUMMARY OF THE INVENTION

It is therefore an object of the present invention to provide a reliable sealing structure for a convertible vehicle body.

Another object of the present invention is to provide a convertible vehicle body having a sealing structure between the front corner portion and the side door having means for positively expelling rain water from the area where edge portions of the side door meet the front corner portions of the roof structure.

According to the present invention, the above and other objects can be accomplished by a convertible vehicle body including front windshield means provided at each side with front pillar means and at a top portion with front header means, roof means having a front edge portion adapted for engagement with said front header means, said roof means being removable from a closed position wherein the front edge portion is engaged with said front header means so that a top portion of the body is open ed when the roof means is removed from the closed position, side door means provided at each side of the body and having a front edge portion adapted for engagement with said front pillar means, said front edge portion of the side door means being provided with weather strip means having an upper end portion adapted to be engaged with a front corner portion of said roof means when the roof means is in the closed position, said front pillar means being provided with surface means extending in a lengthwise direction of the front pillar means for engagement with said weather strip means on said front edge portion of the side door means, said front pillar means being provided at a portion transversely inside the surface means with second weather strip means extending in the lengthwise direction of the front pillar means, said second weather strip means being formed with water pocket means extending in the lengthwise direction of the front pillar means and having an upper end portion located adjacent to the upper end portion of the first weather strip means.

In a preferable aspect of the present invention, the front pillar means includes an outer panel and an inner panel which are connected together at connecting flanges which are located transversely inside the first weather strip means and the second weather strip means is provided on the connecting flanges so that the second weather strip means functions as a trim for covering the connecting flanges. The present invention can be applied to any type of convertible vehicle body. For example, the invention can be applied to a vehicle body in which the roof structure is retracted to the rear body section by means of a linkage as well as to a body in which the roof structure can be taken away to open the top portion of the passenger compartment. It should therefore be understood that the word "removable" as used herein should be construed broadly as covering a roof structure in which the roof can be retracted into the vehicle body as well as the structure in which the roof can be taken away.

The above and other objects and features of the present invention will become apparent from the following descriptions of a preferred embodiment taking reference to the accompanying drawings.

DESCRIPTION OF THE PREFERRED EMBODIMENT

Figure 1:
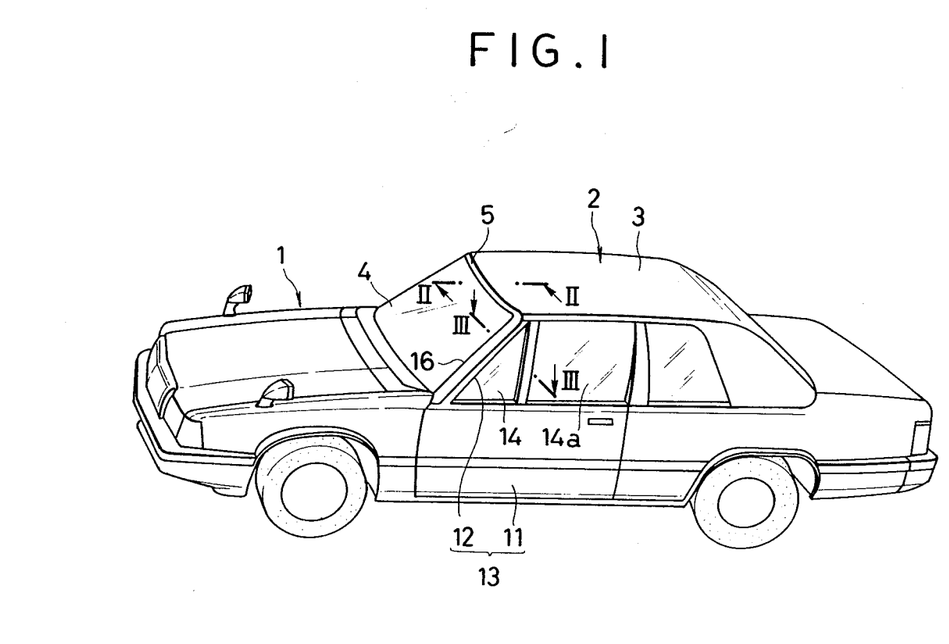
FIG. 1 is a perspective view of a convertible vehicle to which the present invention is embodied.

Referring to the drawings, particularly to FIG. 1, there is shown a convertible vehicle body 1 having a roof structure 2 which covers in the closed position shown in the drawing the top portion of the passenger compartment. The roof structure 2 includes a foldable roof top 3 which may be made of a foldable hood as in conventional convertible vehicles. A suitable linkage is provided to drive the roof 3 between the closed position and the open position. An example of such convertible vehicle body structure is shown in the U.S. Pat. No. 4,261,615 so that detailed description of the roof structure will be omitted. The vehicle body 1 is further provided at each side with a side door 13 including a door panel 11, a front door sash 12, a fixed front door glass 14 and a retractable door glass 14a.

Figure 2:
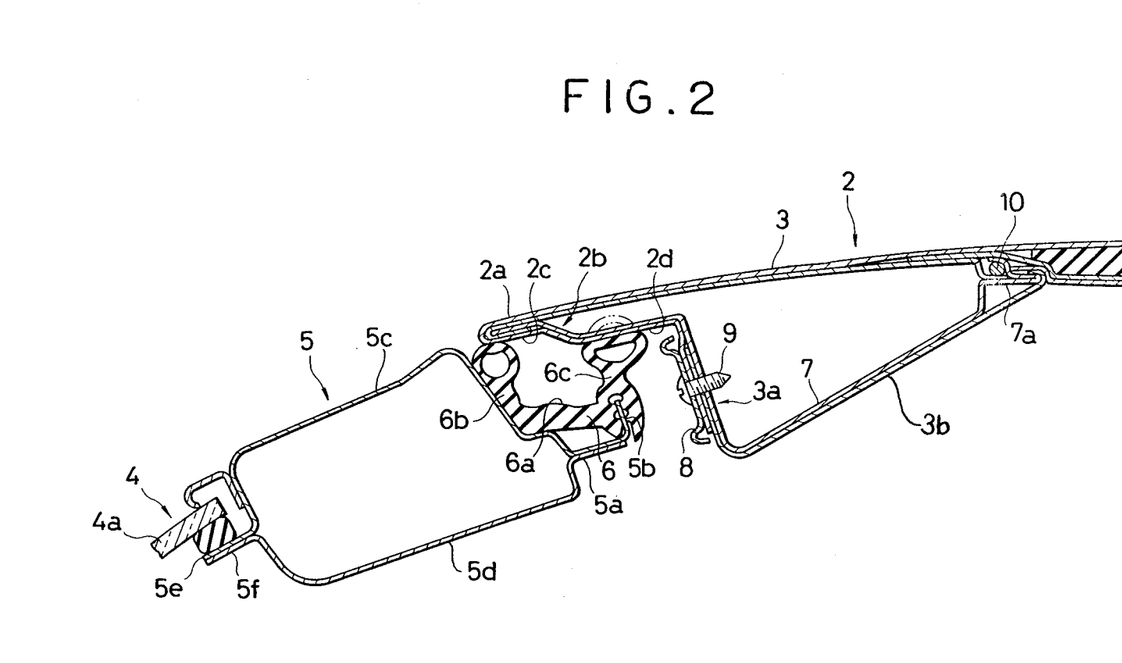
FIG. 2 is a sectional view taken substantially along the line II—II in FIG. 1.
Figure 3:
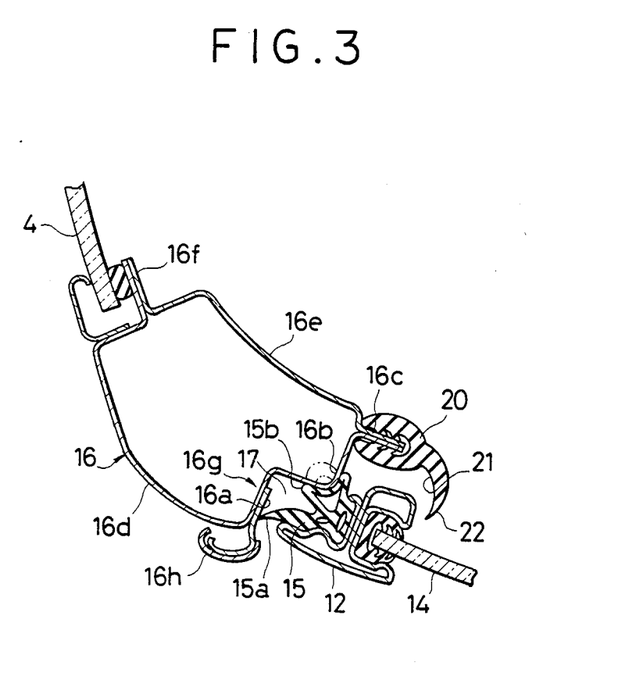
FIG. 3 is a sectional view taken along the line III—III in FIG. 1.

Referring to FIGS. 1 to 3, it will be noted that the vehicle body 1 includes a front windshield structure 4 which comprises a front header 5 and a pair of front pillars 16 extending downwardly from the opposite ends of the front header 5. A front windshield glass 4a is attached to the front header 5 and the front pillar 16 as conventional in the art. In FIG. 2, it will be noted that the front header 5 is formed by an outer panel 5c and an inner panel 5d which have rear connecting flanges 5b and 5a, respectively, and front connecting flanges 5e and 5f, respectively, the outer and inner panels 5c and 5d are welded together at the connecting flanges. As shown in FIG. 2, the connecting flanges 5b on the outer panel 5c is bent upwards and there is provided along the upwardly bent portion of the connecting flange 5b a weather strip 6.

The weather strip 6 is of a substantially U-shaped cross-section having a front lip 6b and a rear lip 6c. A groove 6a is therefore defined in the weather strip 6 between the front lip 6b and the rear lip 6c. In FIG. 2, it will be noted that the roof structure 2 has a front edge portion 2a which is provided at the inner surface with a stepped portion 2b defining a front sealing surface 2c and a rear sealing surface 2d. Structurally, the front edge portion 2a of the roof structure 2 is formed by a transversely extending hollow frame 7 which is covered by a front portion of the cloth of the foldable hood 3. The inner surface of the frame 7 is covered by an inner trim cloth 3b which is laid at the front edge under the front end of the hood cloth at the mating section 3a. A trim plate 8 is laid on the superposed edges of the clothes at the mating section 3a and attached to the frame by means of screws 9. At the rear edge portion 7a of the frame 7, there is provided a top wire 10 which constitutes a part of the roof operating linkage. As shown in FIG. 2, the front sealing surface 2c engages the front lip 6b of the weather strip 6 whereas the rear sealing surface 2d engages the rear lip 6c. The engagement between the front sealing surface 2c and the front lip of the weather strip 6 is generally sufficient for providing a required weather-tightness but there may be a possibility of leakage through this sealing structure. The water which has passed through the sealing area between the front sealing surface 2c and the front lip 6b of the weather strip 6 is received by the groove 6a and expelled from the groove 6a sidewardly so that any possibility of water leaking into the passenger compartment can be eliminated.

Referring to FIG. 3, it will be noted that the front door sash 12 carries a weather strip 15 having an outer lip 15a and an inner lip 15b with a groove 17 defined therebetween. The groove 17 is covered with the front pillar 16 to form a closed cross-sectional space so that the water expelled from the groove 6a is substantially introduced thereinto. The front pillar 16 is constituted by an outer panel 16d and an inner panel 16e which are connected together by weldings at front connecting flanges 16f and rear connecting flanges 16c to form a structure of closed cross-section. Laterally outside the rear connecting flanges 16c, the outer panel 16d is formed with a stepped portion 16g which defines an outer sealing surface 16a and an inner sealing surface 16b. In the illustrated embodiment, the inner sealing surface 16b is defined at a corner of the stepped portion 16g. As shown in FIG. 3, the outer lip 15a of the weather strip 15 on the door sash 12 is engaged with the outer sealing surface 16a whereas the inner lip 15b of the weather strip 15 is engaged with the inner sealing surface 16b of the front pillar 16.

Figure 4:
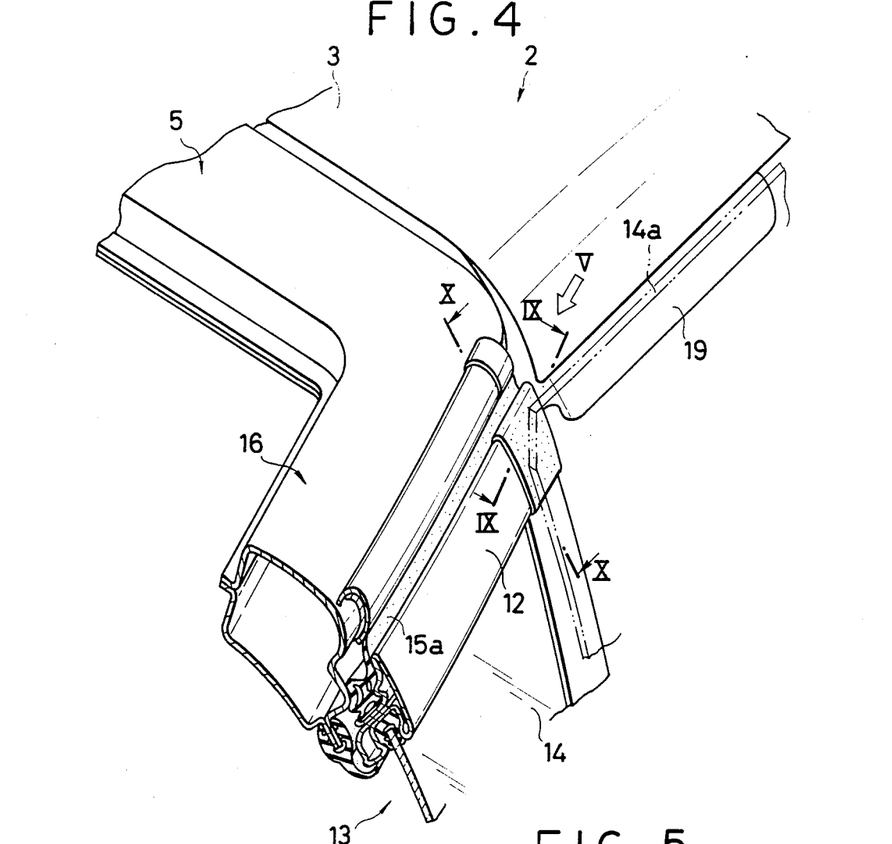
FIG. 4 is a fragmentary perspective view of the vehicle body showing particularly the front corner portion of the roof structure.
Figure 6:
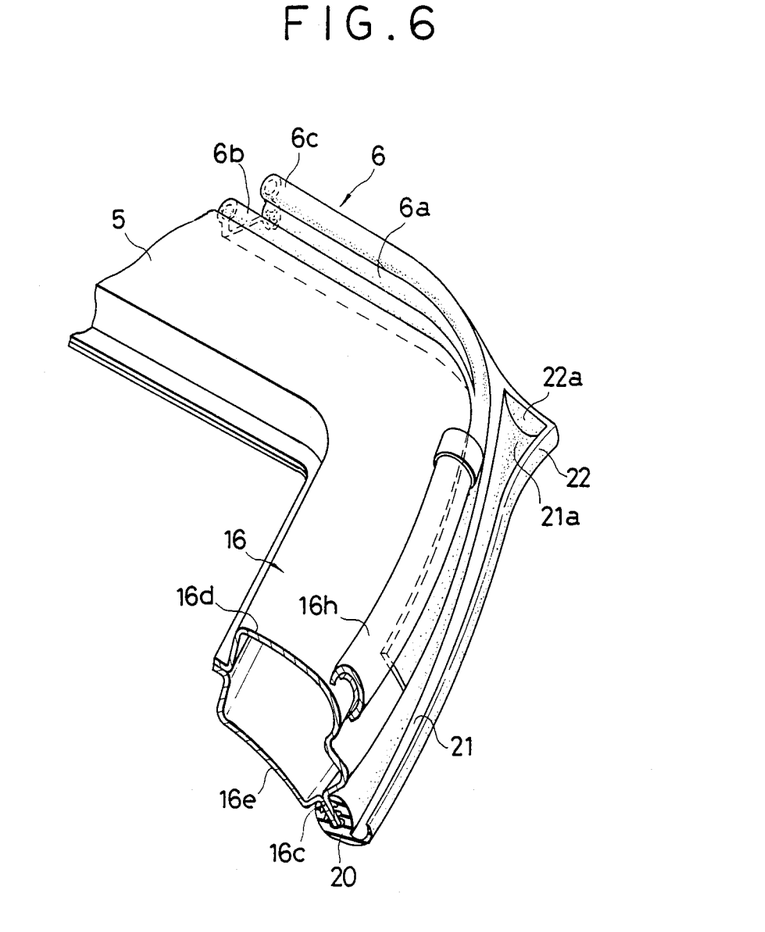
FIG. 6 is a fragmentary perspective view showing the weather strip on the front header and the front pillar.

In FIGS. 3, 4 and 6, it will be noted that the front pillar 16 is provided with a rain drip rail 16h which is located outside the outer sealing surface 16a and extends along the length of the front pillar 16. As shown in FIG. 6, the rain drip rail 16h has an upper end located adjacent to an transverse end of the groove 6a defined in the weather strip 6 so that the water expelled from the groove 6a is directed to the rain drip rail 16h.

It will be noted in FIG. 3 that a further weather strip 20 is provided on the connecting flanges 16c of the front pillar 16. The weather strip 20 covers the connecting flanges 16c so that it functions as a trimming strip or a seaming welt. As shown in FIG. 6, the weather strip 20 is formed integrally with the weather strip 6 on the front header 5 and has a lip 22 which defines a groove 21 extending along the length of the front pillar 16. The groove 21 of the weather strip 20 extends upwardly to the upper end of the front pillar 16 and has an upper end closed by an end wall 22a. In the illustrated embodiment, the groove 21 is expanded at the upper end portion to form a water pocket 21a.

Figure 5:
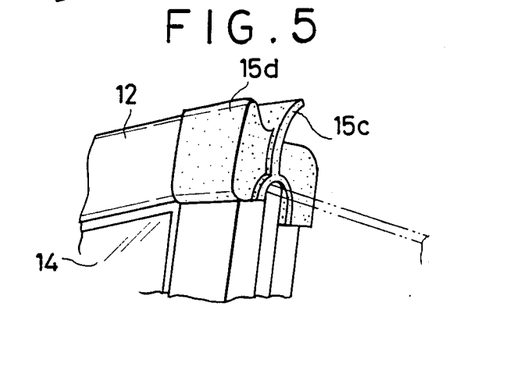
FIG. 5 is a fragmentary perspective view of the side door structure as seen in the direction of the arrow V in FIG. 4.
Figure 7:
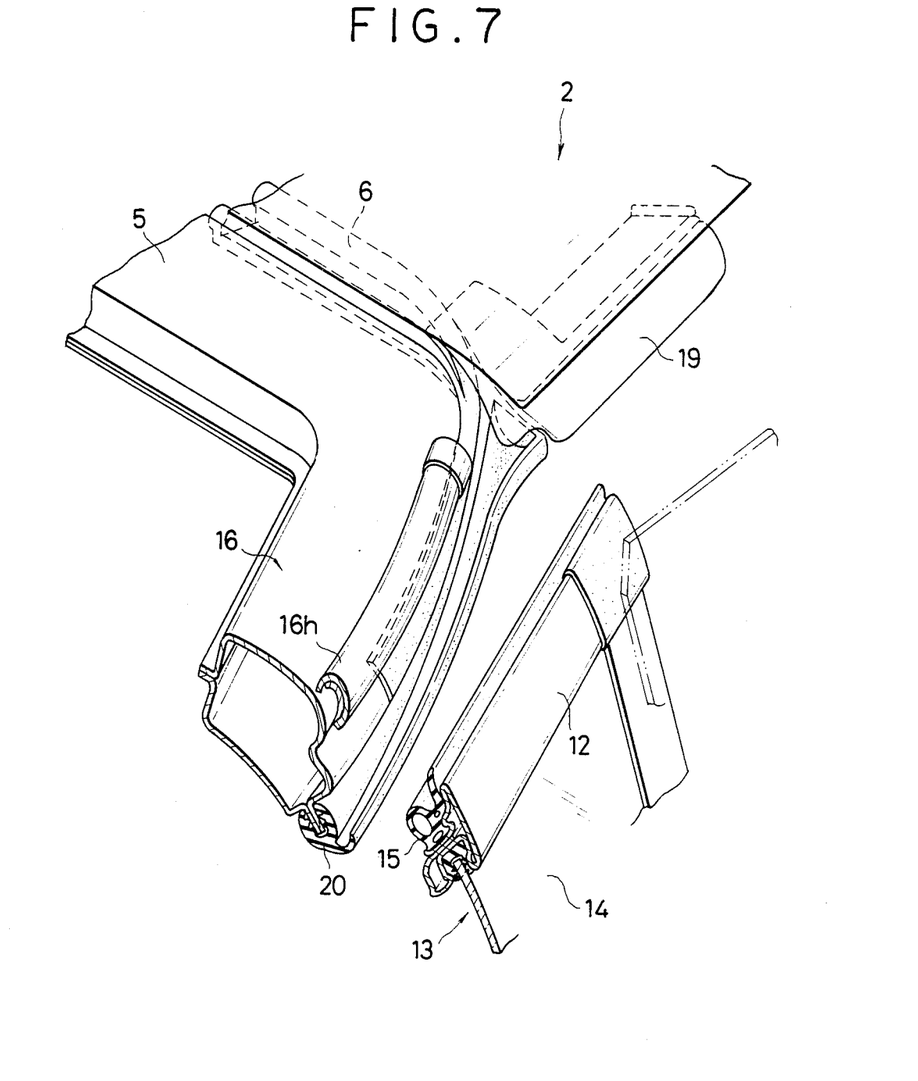
FIG. 7 is a perspective view similar to FIG. 6 but showing the roof structure in the closed position.
Figure 8:
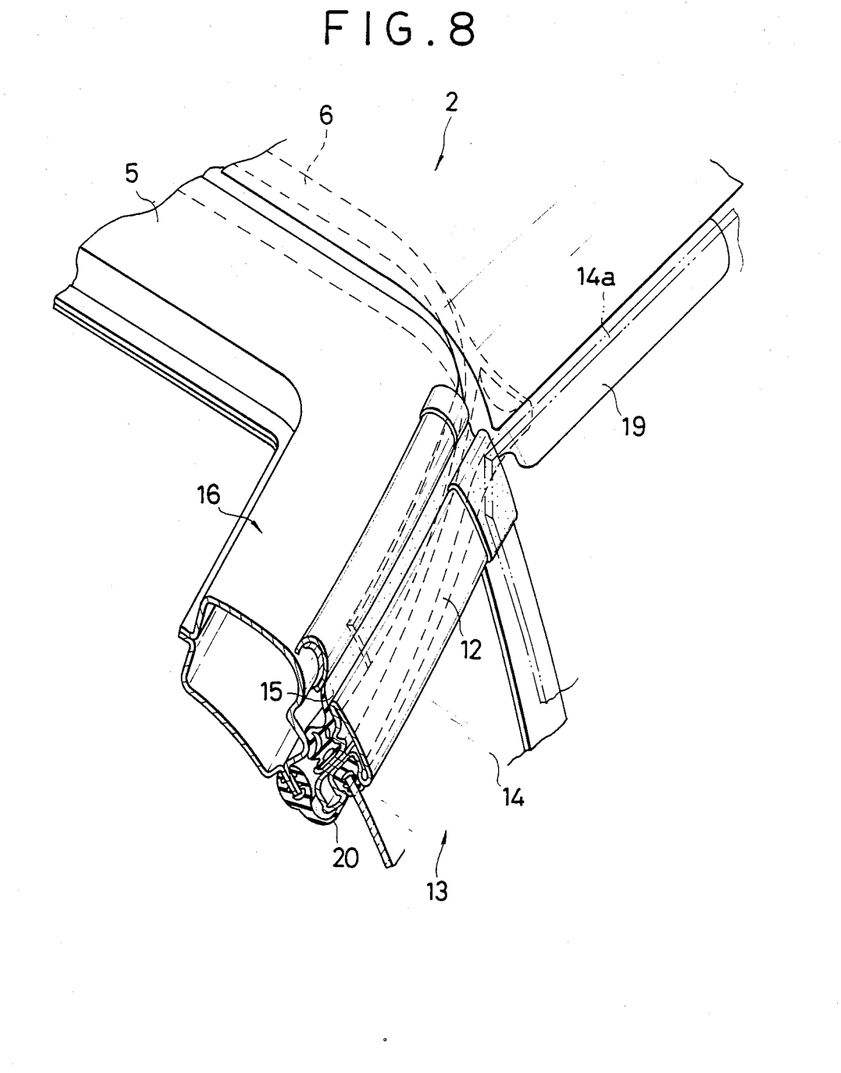
FIG. 8 is a perspective view similar to FIG. 6 but showing the roof structure and the side door in the closed positions.
Figure 9:
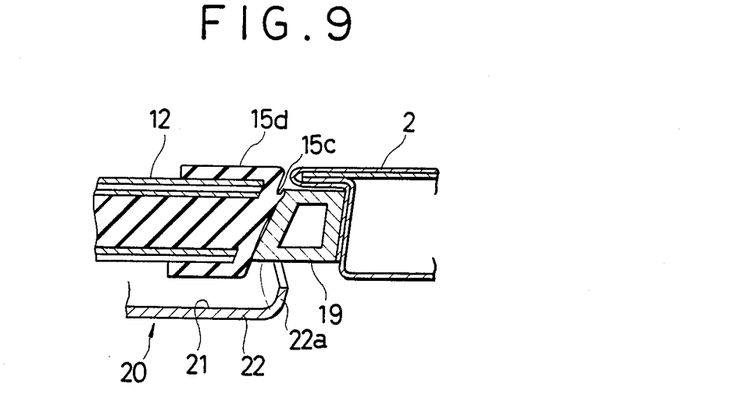
FIG. 9 is a sectional view taken along the line IX—IX in FIG. 4.
Figure 10:
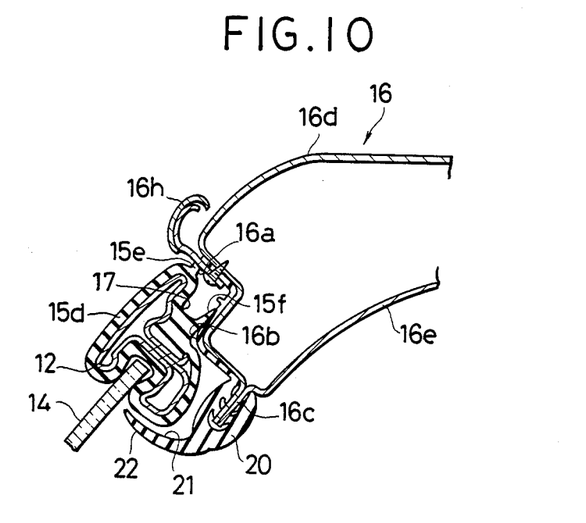
FIG. 10 is a sectional view taken along the line X—X in FIG. 4.

As shown in FIG. 7, the roof 3 is provided at each front side corner with a sealing member 19 which is adapted to be engaged with the rear sealing lip 6c of the weather strip 6 at the end portion of the front header 5. In FIGS. 8 and 9, it will be noted that the upper end of the sash 12 on the side door 13 is located adjacent to the front corner of the roof structure 2 when the door is closed. As shown in FIGS. 5, 9 and 10, the sash 12 on the door 13 is provided at an upper end portion with a weather strip 15d which is contiguous with the weather strip 15 on the sash 12 of the side door 13. The weather strip 15d is formed at the upper end with a sealing lip 15c which engages the front end of the seal 19 on the roof structure 2. As shown in FIG. 10, the weather strip 15d has sealing lips 15e and 15f which are contiguous with the sealing lips 15a and 15b and engaged with the sealing surfaces 16a and 16b, respectively of the front pillar 16. The sealing lip 15e is formed continuous with the sealing lip 15c. Thus, a weather-tight seal is provided at the corner portion where the front windshield structure, the roof structure and the side door structure meet together. In case where there is any leakage of water through the sealing structure, the water is received by the water pocket 21a and expelled to the outside of the body through the groove 21 formed in the weather strip 20.

The invention has thus been shown and described with reference to a specific embodiment, however, it should be noted that the invention is in no way limited to the details of the illustrated structures but changes and modifications may be made without departing from the scope of the appended claims.

We claim:

1. A convertible vehicle body including front windshield means provided at each side with front pillar means and at a top portion with front header means, roof means having a front edge portion adapted for engagement with said front header means, said roof means being removable from a closed position wherein the front edge portion is engaged with said front header means so that a top portion of the body is opened when the roof means is removed from the closed position, side door means provided at each side of the body and having a front edge portion adapted for engagement with said front pillar means, said front edge portion of the side door means being provided with first weather strip means having an upper end portion adapted to be engaged with a front corner portion of said roof means when the roof means is in the closed position, said front pillar means being provided with surface means extending in a lengthwise direction of the front pillar means for engagement with said first weather strip means on said front edge portion of the side door means, said front pillar means being provided at a portion inside the vehicle body relative to the surface means with second weather strip means extending in the lengthwise direction of the front pillar means, said second weather strip means being formed with water pocket means extending in the lengthwise direction of the front pillar means and having an upper end portion located adjacent to the upper end portion of the first weather strip means.

2. A convertible vehicle body in accordance with claim 1 in which said front header means has third weather strip means extending transversely of the body for engagement with said front edge portion of the roof means.

3. A convertible vehicle body in accordance with claim 2 in which said third weather strip means is of a substantially U-shaped cross-section having a pair of lip portions spaced apart in a longitudinal direction of the body to define a groove therebetween, the front edge portion of the roof means being adapted for engagement with both the lip portions of the third weather strip means.

4. A convertible vehicle body in accordance with claim 2 in which said third weather strip means is integrally formed with the second weather strip means.

5. A convertible vehicle body in accordance with claim 3 in which water expelled from the groove is substantially introduced into groove means defined by the front pillar means and a drip rail.

6. A convertible vehicle body in accordance with claim 1 in which said first weather strip means has first sealing lip means for engagement with said front pillar means and second sealing lip means for engagement with said front corner portion of the roof means.

7. A convertible vehicle body in accordance with claim 6 in which said first and second sealing lip means on the first weather strip means are contiguous with each other.

8. A convertible vehicle body in accordance with claim 1 in which said first weather strip means has first and second sealing strip means which are spaced apart in a transverse direction of the body to form a groove therebetween.

9. A convertible vehicle body in accordance with claim 1 in which said water pocket means in said second weather strip means is formed by a groove extending along the front pillar means and an expanded portion formed at an upper end of the groove.

10. A convertible vehicle body in accordance with claim 9 in which said expanded portion of the groove is closed at an upper end by an end wall.

11. A convertible vehicle body in accordance with claim 1 in which said roof means includes foldable hood means which covers the top portion of the body in said closed position.

12. A convertible vehicle body in accordance with claim 11 in which said hood means includes a frame extending transversely at a front end portion of the hood means and connected with a hood cloth of the hood means.

13. A convertible vehicle body in accordance with claim 1 in which said front pillar means has connecting flange means, said second weather strip means being provided on said connecting flange means.

14. A convertible vehicle body in accordance with claim 1 in which said front pillar means includes an outer panel and an inner panel which are connected together at front and rear connecting flanges, said second weather strip means being provided on said rear connecting flanges.

15. A convertible vehicle body including front windshield means provided at each side with front pillar means and at a top portion with front header means, roof means having a front edge portion adapted for engagement with said front header means, said roof means being removable from a closed position wherein the front edge portion is engaged with said front header means so that a top portion of the body is opened when the roof means is removed from the closed position, side door means provided at each side of the body and having a front edge portion adapted for engagement with said front pillar means, said front edge portion of the side door means being provided with first weather strip means having an upper end portion adapted to be engaged with a front corner portion of said roof means when the roof means is in the closed position, said front pillar means being provided with surface means extending in a lengthwise direction of the front pillar means for engagement with said first weather strip means on said front edge portion of the side door means, said front pillar means being provided at a portion inside the vehicle body relative to the surface means with second weather strip means extending in the lengthwise direction of the front pillar means, said second weather strip means being formed with groove means extending in the lengthwise direction of the front pillar means and water pocket means formed at an upper end portion of said groove means and located adjacent to the upper end portion of the first weather strip means.

16. A convertible vehicle body in accordance with claim 1 in which said roof means is provided at said front corner portion with seal means for engagement with the upper end portion of the first weather strip means on the side door means.

* * * * *